United States Patent [19]

Le Deit

[11] Patent Number: 5,588,508
[45] Date of Patent: Dec. 31, 1996

[54] DISK BRAKE USING A PULLED PAD WITH PERMANENT BEARING

[75] Inventor: Gerard Le Deit, Courtry, France

[73] Assignee: AlliedSignal Europe Services Technique, Drancy, France

[21] Appl. No.: 204,246
[22] PCT Filed: Feb. 17, 1994
[86] PCT No.: PCT/FR94/00175
 § 371 Date: Mar. 7, 1994
 § 102(e) Date: Mar. 7, 1994
[87] PCT Pub. No.: WO94/24454
 PCT Pub. Date: Oct. 27, 1994

[30] Foreign Application Priority Data

Apr. 15, 1993 [FR] France .................... 93 04393

[51] Int. Cl.⁶ .................................... F16D 55/00
[52] U.S. Cl. ....................... 188/73.31; 188/73.1
[58] Field of Search ..................... 188/72.4, 73.1, 188/73.31, 73.45, 73.44, 370

[56] References Cited

U.S. PATENT DOCUMENTS 4,567,968  2/1986  Denree ................... 188/73.45 X

FOREIGN PATENT DOCUMENTS 55-135237  10/1980  Japan ..................... 188/73.31
92/17713   10/1992  WIPO ..................... 188/73.1

Primary Examiner—Peter M. Poon
Attorney, Agent, or Firm—Leo H. McCormick, Jr.

[57] ABSTRACT

A sliding-caliper disk brake in which the pads (3) have lugs (31,32) function by bearing on a first side of a carrier and in traction on a second side. The braking forces which are exerted on the pad (3) in a central zone (30) make the pad (3) rotate about a fastening point (A) located on the first side while bearing (B) of the second side along a tangent (T) which forms an obtuse angle (G) with a straight line (D) which joins the fastening (A) and bearing (B) points, this angle being contained in the central zone (30) of the pad (3).

8 Claims, 3 Drawing Sheets

DISK BRAKE USING A PULLED PAD WITH PERMANENT BEARING

The present invention relates to a disk brake for a motor vehicle, comprising a first support which is fixed with respect to the vehicle, a second support shaped into a caliper and slidable with respect to the first one, pads each of which is held by one of the supports so as to resist the drive forces to which it is subjected in the event of braking, and a brake motor associated with the second support and capable of being actuated so as to give rise to the application of said pads onto the disk according to a movement which is substantially perpendicular to the latter, each pad having a central friction zone where the resultant of the drive forces is applied and two lateral ends, the first of which is offset with respect to the central zone in the direction of rotation of the disk and at least the second of which has a drive profile, the support of this pad having two housings, the second of which presents a retaining profile interacting with this drive profile in a fastening zone in order to retain this pad when it is stressed in the direction of rotation of the disk by the drive forces, and at least the first end of each pad having an external contact surface suitable for abutting, in a bearing zone, against a corresponding internal contact surface of a first bearing surface provided on the first housing of the support for this pad.

Disk brakes of this type have been known for a long time in the prior art, and an example thereof is given in U.S. Pat. No. 4,044,864.

From a theoretical point of view, these brakes a priori have the advantage of allowing the pad, on which the driving loads are applied in the event of braking, to transmit these loads to the support which holds it in place, that is to say generally to the first support called a "carrier", through each of the two ends of this pad, one of which thus works in traction, and the other in bearing.

From an actual point of view, the situation is, however, very different and much less advantageous, the simultaneous nature of the traction and thrust loads practically never being obtained.

Indeed, in known brakes of the aforementioned type, the distribution of the traction and thrust loads depends extremely critically both on the dimensions of the pad and of the support which receives it, these dimensions themselves being subjected not only to manufacturing tolerances but also to variable deformations of the brake under the effect of more or less intense braking loads, and/or more or less significant temperature rises.

In this context, the object of the invention is to propose a sliding-caliper disk brake in which the transmission to the pad support of the loads received by the latter may be produced at both ends of the pad without being subjected, in a hindering fashion, to the influence of undesirable parameters such as those which have just been expounded.

To this end, the disk brake of the invention is essentially characterized in that each pad is stressed with respect to its support and towards the bearing zone by an elastic force having at least one first component pointing along the radius of the disk which passes through the central friction zone, in that each pad has a relative freedom of rotation in its plane about the fastening zone, in that the internal and external contact surfaces together define, in the bearing zone, a tangent in a plane containing the pad, in which a straight line connecting the fastening zone to the bearing zone defines, together with said tangent, an angle inside which the central friction zone is located, and in that this angle is obtuse and less than a flat angle.

According to a simple embodiment of the invention, at least one of the two contact surfaces has a rounded profile, and these surfaces have different radii of curvature at least in the bearing zone.

One of the two contact surfaces may therefore be essentially concave and the other convex, each one having rounded profile and each concave contact surface having a radius of curvature which is greater than the radius of curvature of the corresponding convex surface.

The drive profile provided on the pad advantageously takes the form of a slot which is open towards the outside of the disk and the retaining profile provided on the pad support comprises a retaining tab pointing towards the inside of the disk and engaged in this slot.

The first component of the elastic force is, for example, centrifugal and the elastic force possibly has a second component perpendicular to the radius of the disk passing through the central zone of the pad and pointing in the direction of rotation of the disk.

In order to optimize the effectiveness of braking in both directions of travel of the vehicle, it is possible to make provision for each pad to include an external contact surface and a drive profile at each of its ends.

In this case, in which two support zones are defined on the pad support on either side of this pad, each lateral pad end preferably has, between its external contact surface and its drive profile, a width greater than a minimal width which the corresponding housing of the pad support has beyond the bearing zone towards the outside of the disk, which results in the two lateral ends of the pad bearing simultaneously on the pad support in their respective bearing zones.

Finally, the control of the forces transmitted by the first end of the pad may still be improved by making the internal contact surface of the support for this pad at this end substantially plane in the bearing zone.

Other features and advantages of the invention will emerge clearly from the description which is given hereafter by way of non-limiting example and with reference to the appended drawings in which.

Figure 1:
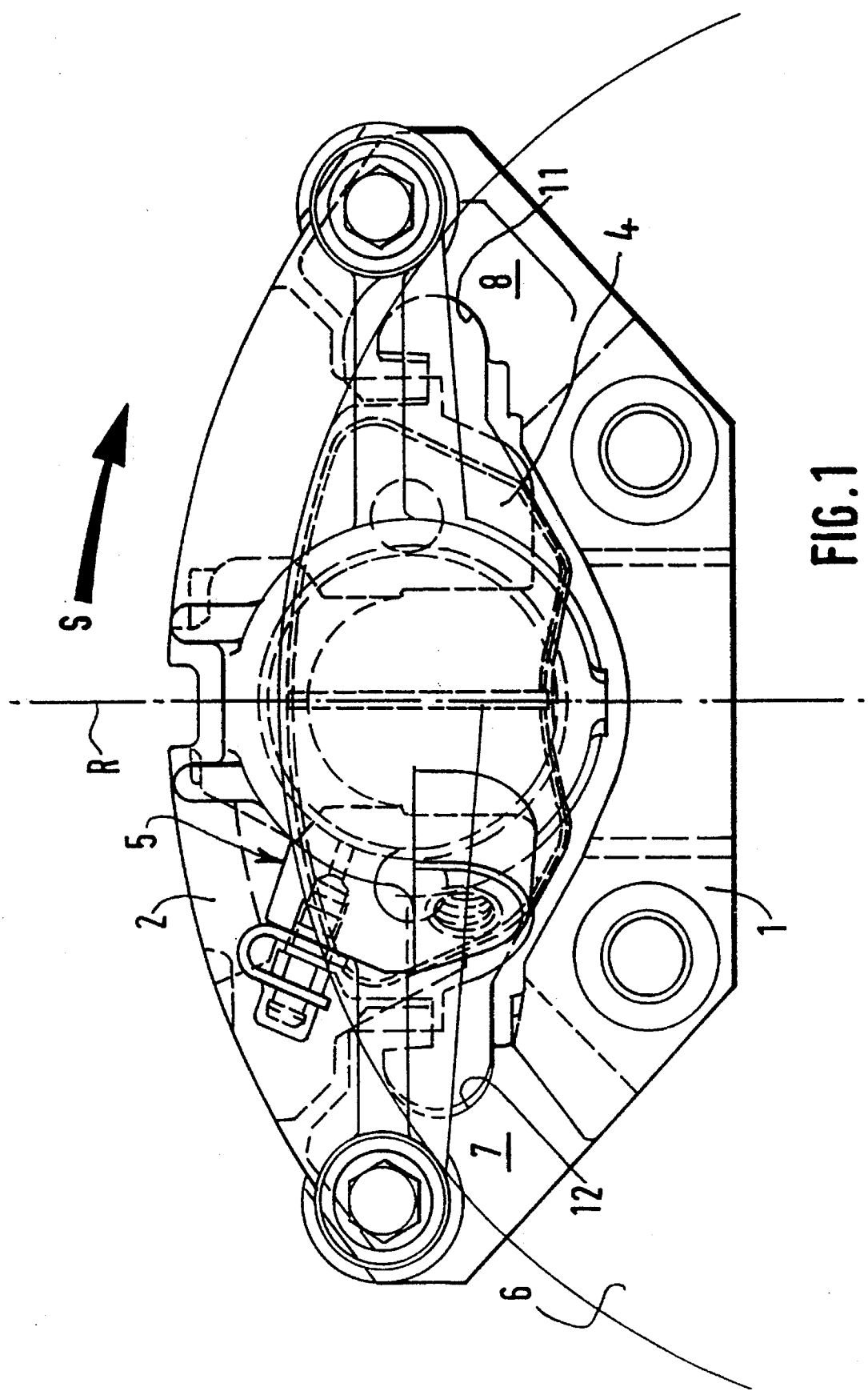
FIG. 1 is a front view of a disk brake in accordance with the invention.

The invention generally relates to sliding-caliper disk brakes intended to equip automotive vehicles.

Such brakes comprise a first support 1, called a "carrier", fixed with respect to the vehicle, a second support 2 shaped into a caliper and slidably mounted with respect to the first one, pads 3, 4 each of which is held by one of the supports, generally by the carrier 1, so as to resist the drive forces to which it is subjected in the event of braking, and a brake motor 5 associated with the second support 2, and capable of being actuated so as to give rise to the application of the pads 3, 4 onto the disk 6 according to a movement which is substantially perpendicular to the latter.

Each pad 3, 4 conventionally has a central friction zone such as 30 (FIG. 2) and two lateral ends 31, 32, the first 31 of which is offset with respect to the central zone 30 in the direction of rotation S of the disk 6 and at least the second 32 of which has a drive profile 32a.

On its side, the support for this pad, for example the carrier 1, has a retaining profile 7a inter-acting with the drive profile 32a of the pad 3 in a fastening zone in the vicinity of the point A, in order to retain this pad when it is stressed in the direction of rotation S of the disk 6 by the drive forces.

Moreover, at least the first end 31 of each pad such as 3 has an external contact surface 31b suitable for abutting, in a bearing zone in the vicinity of the point B, against a corresponding internal contact surface 8b of a first bearing surface 8 provided on the support 1 for this pad.

Figure 2:
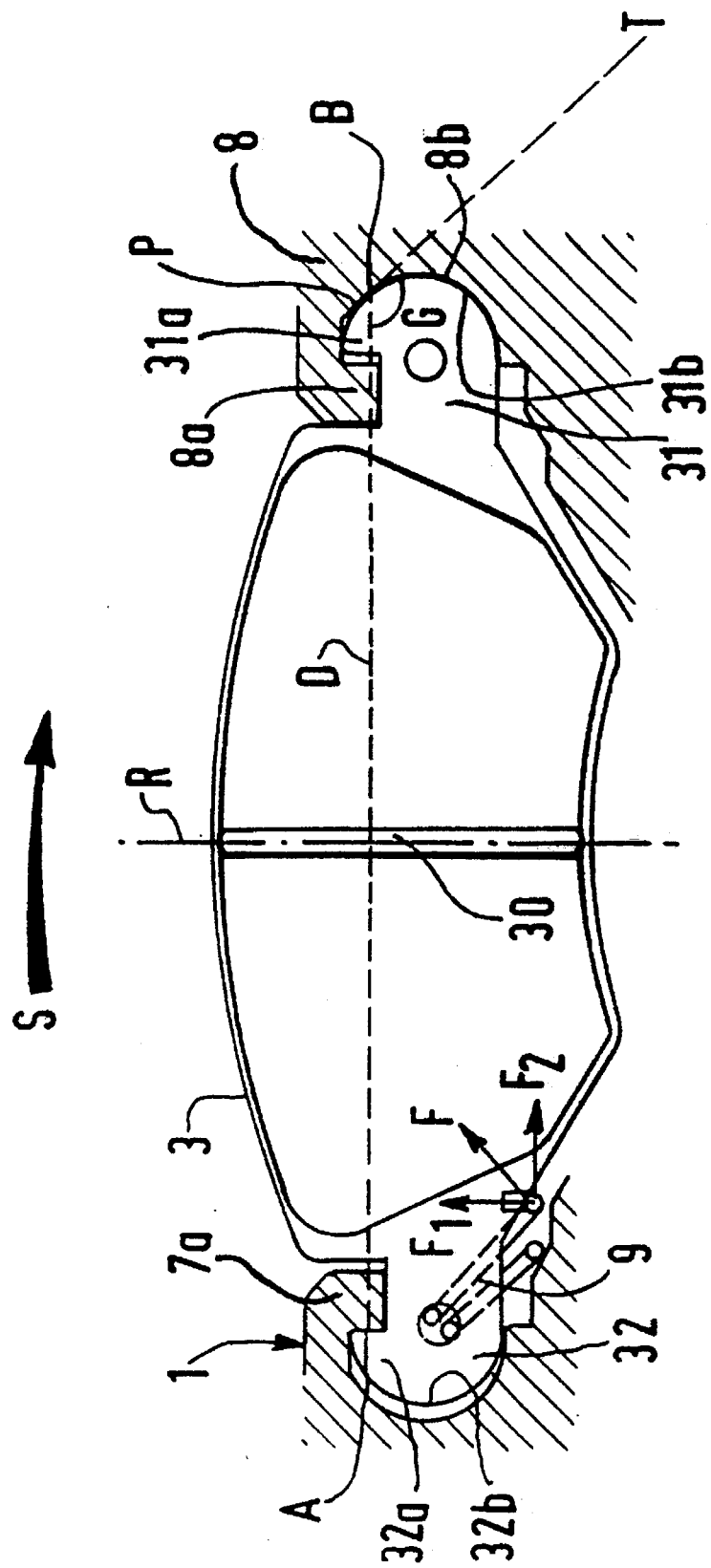
FIG. 2 is a diagrammatic view illustrating the principle of the invention.

According to the invention, each pad such as 3 is stressed with respect to its support 1 and towards the bearing zone by an elastic force F having at least a first component F1 pointing along the radius R of the disk 6 which passes through the central friction zone 30, force for example being exerted by a spring 9 located on the second end of the pad (FIG. 2).

Each pad is dimensioned with respect to the support so as to have a relative freedom of rotation in its plane about a fastening zone, that is to say so as to form a rotation in the plane of FIG. 2 and centered on the point A.

The internal and external contact surfaces 8b, 31b together define, in the bearing zone, a tangent T in a plane containing the pad, and the straight line D connecting the fastening zone A to the bearing zone B defines, with this tangent T, an angle G.

According to an important feature of the invention the angle G is obtuse, less than a flat angle, and contains the central friction zone 30.

At least one of the two contact surfaces very advantageously has a rounded profile, and these surfaces have different radii of curvature, at least in the bearing zone, that is to say in the vicinity of the point B.

In the most simple embodiment, one of the two contact surfaces is concave and the other is convex, it being possible for another alternative to consist of using a convex surface and a plane surface.

In reality, even in the case where one of the two contact surfaces is concave, it remains advantageous to give the latter a substantially plane profile P in the bearing zone, as represented in FIG. 2.

The drive profile 32a provided on the pad assumes, for example, the form of a slot which is open towards the outside of the disk and the retaining profile 7a provided on the pad support 1 assumes that of a retaining tab pointing towards the inside of the disk and engaged in the slot.

Preferably, the first component F1 of the elastic force F exerted by the spring 9 is centrifugal and this elastic force F has a second component F2 which is perpendicular to the radius R of the disk 6 passing through the central zone of the pad and pointing in the direction of rotation of the disk, this distribution of forces making it possible to put the pad permanently in the position towards which it is displaced naturally under the effect of the braking forces which are exerted in the central zone 30 and which tend to make it rotate about the fastening zone A.

By virtue of these features, the clearances which it is necessary to provide for the satisfactory sliding of the pads no longer play a part in the transmission of the loads by the ends of the pads, the distribution of these loads therefore being freed of the influence of the imperfect control of these clearances, as well as of their possible variations.

As shown in the figures, each pad may include an external contact surface 31b, 32b and a drive profile 31a, 32a at each of its ends to allow braking which is as effective when the vehicle is in reverse, as for forward travel.

Figure 3:
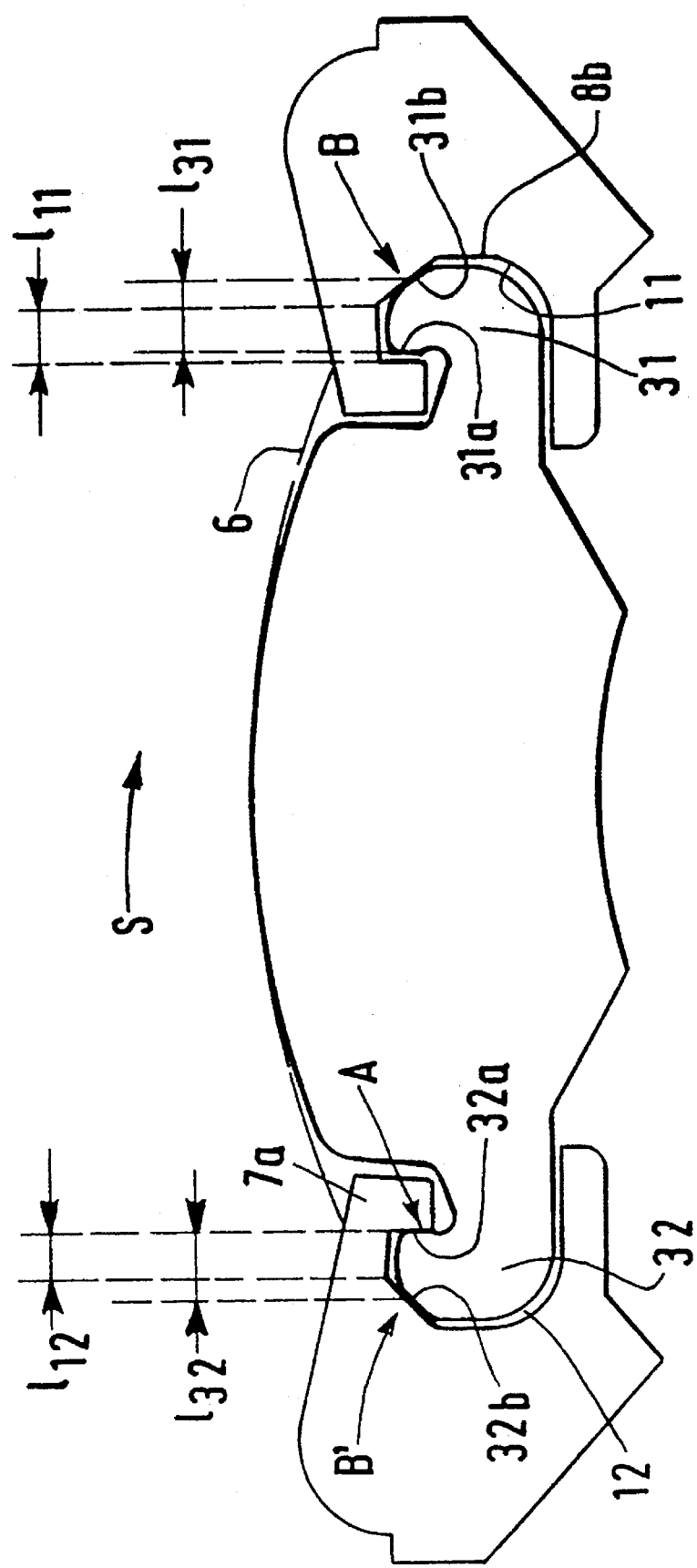
FIG. 3 is a diagrammatic view illustrating a particular characteristic of the invention.

In this case, as shown in FIG. 3, each lateral end 31, 32 of the pad preferably has, between its external contact surface 31b, 32b and its drive profile 31a, 32a a width $l_{31}$, $l_{32}$ greater than a minimal width $l_{11}$, $l_{12}$ which the corresponding housing 11, 12 of the pad support has beyond the bearing zone B, B' towards the outside of the disk 6, which results in the two lateral ends 31, 32 of the pad bearing simultaneously on the pad support in their respective bearing zones B, B'.

I claim:

1. A disk brake for a motor vehicle, comprising: a first support which is fixed with respect to the vehicle, a second support shaped into a caliper and slidable with respect to said first support, one of said first and second supports constituting a pad support, first and second pads being held by said pad support so as to resist drive forces developed during a brake application, and a brake motor associated with said second support and capable of being actuated so as to give rise to the application of said first and second pads onto a rotor by moving in a direction substantially perpendicular to the rotor, said first and second pads each having a central friction zone where a resultant of the drive forces is applied and first and second lateral ends, said first lateral end of at least one of said first and second pads end being offset with respect to said central friction zone in a direction of rotation of said rotor and at least said second lateral end of at least one of said first and second pads having a drive profile, each pad being supported by first and second housings, said second housing having a retaining profile interacting with said drive profile on said second lateral end of at least one of said first and second pads to define a fastening zone to retain each of said pads when each of said pads is stressed in the direction of rotation of the rotor by drive forces, and at least said first lateral end of each pad having an external contact surface suitable for abutting a beating zone in a corresponding internal contact surface of a first bearing surface located on said first housing, characterised in that each pad is stressed with respect to said first and second housings towards said beating zone by an elastic force having at least a first component pointing along the radius of the rotor which passes through said central friction zone, said first and second pads each having a relative freedom of rotation in a plane about said fastening zone and said internal and external contact surfaces together define in said bearing zone a tangent in a plane containing each pad and in that a straight line connecting said fastening zone to said beating zone defines, together with said tangent, an angle inside which said central friction zone is located, said angle being obtuse and less than a flat angle.

2. The disk brake according to claim 1, characterized in that at least one of said external and internal contact surfaces has a rounded profile and in that said external and internal contact surfaces have a different radii of curvature at least in said bearing zone.

3. The disk brake according to claim 2, characterized in that one of said external and internal contact surfaces is concave and the other convex, said concave contact surface having a radius of curvature which is greater than the radius of curvature of said convex contact surface.

4. The disk brake according to claim 1, characterized in that said elastic force has a second component perpendicular to the radius of said rotor which passes through the central zone of the pad and pointing in the direction of rotation of said rotor.

5. The disk brake according to claim 1, characterized in that said bearing zone of each pad is defined on the pad support on said first and second lateral ends of each pad and in that said first and second lateral ends of each of said pads bear simultaneously on the respective bearing zone of said pad support.

6. The disk brake according to claim 1, characterized in that said internal contact surface is substantially flat in said bearing zone.

7. A disk brake for a motor vehicle, comprising: a first support which is fixed with respect to the vehicle, a second support shaped into a caliper and slidable with respect to said first support, one of said first and second supports constituting a pad support, first and second pads being held by said pad support so as to resist drive forces developed during a brake application, and a brake motor associated with said second support and capable of being actuated so as to give rise to the application of said first and second pads onto a rotor by moving in a direction substantially perpendicular to the rotor, said first and second pads each having a central friction zone where a resultant of the drive forces is applied and first and second lateral ends, said first lateral end of at least one of said first and second pads being offset with respect to said central friction zone in a direction of rotation of said rotor and at least said second lateral end of at least one of said first and second pads having a drive profile, each pad being supported by first and second housings, said second housing having a retaining profile interacting with said drive profile on said second lateral end of at least one of said first and second pads to define a fastening zone to retain each of said pads when each of said pads is stressed in the direction of rotation of the rotor by drive forces, and at least said first lateral end of each pad having an external contact surface suitable for abutting a bearing zone in a corresponding internal contact surface of a first bearing surface located on said first housing, characterised in that each pad is stressed with respect to said first and second housings towards said bearing zone by an elastic force having at least a first component pointing along the radius of the rotor which passes through said central friction zone, said first and second pads each having a relative freedom of rotation in a plane about said fastening zone and said internal and external contact surfaces together define in said bearing zone a tangent in a plane containing each pad and in that a straight line connecting said fastening zone to said bearing zone defines, together with said tangent, an angle inside which said central friction zone is located, said angle being obtuse and less than a flat angle said drive profile includes a slot located on each of said pads and open towards the outside of said rotor and said retaining profile includes a retaining tab provided on said pad support, said retaining tab pointing towards the inside of said rotor and engaged in said slot.

8. The disk brake according to claim 7, characterized in that said first component of the elastic force is centrifugal.

* * * * *